United States Patent
Hayashi et al.

(10) Patent No.: US 9,801,247 B2
(45) Date of Patent: Oct. 24, 2017

(54) LIGHT-DIMMING DEVICE

(71) Applicant: Panasonic Intellectual Property Management Co., Ltd., Osaka (JP)

(72) Inventors: Masanori Hayashi, Osaka (JP); Yoshifumi Suehiro, Osaka (JP); Kiyoshi Goto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/300,089

(22) PCT Filed: Mar. 26, 2015

(86) PCT No.: PCT/JP2015/001711
§ 371 (c)(1),
(2) Date: Sep. 28, 2016

(87) PCT Pub. No.: WO2015/151465
PCT Pub. Date: Oct. 8, 2015

(65) Prior Publication Data
US 2017/0150569 A1 May 25, 2017

(30) Foreign Application Priority Data

Apr. 3, 2014 (JP) ................. 2014-077194

(51) Int. Cl.
*H05B 37/02* (2006.01)
*H05B 33/08* (2006.01)
*H05B 39/04* (2006.01)

(52) U.S. Cl.
CPC ..... *H05B 33/0851* (2013.01); *H05B 33/0809* (2013.01); *H05B 33/0815* (2013.01);
(Continued)

(58) Field of Classification Search
CPC ............ H05B 33/0815; H05B 33/0845; H05B 39/041; H05B 39/044; H05B 33/0851;
(Continued)

(56) References Cited

U.S. PATENT DOCUMENTS 8,310,163 B2 * 11/2012 Chen .................. H05B 33/0809
315/159
8,975,785 B2 * 3/2015 Goto ...................... H02M 1/08
307/86
(Continued)

FOREIGN PATENT DOCUMENTS

JP 2001-016804 A 1/2001
JP 2010-146527 A 7/2010
(Continued)

OTHER PUBLICATIONS

International Search Report for corresponding International Application No. PCT/JP2015/001711 mailed Jun. 9, 2015.
(Continued)

*Primary Examiner* — Vibol Tan
(74) *Attorney, Agent, or Firm* — Renner, Otto, Boisselle & Sklar, LLP

(57) ABSTRACT

A light-dimming device includes a switch including a switching device, a controller, and a power supply module. The power supply module includes a capacitor to be charged by a constant voltage circuit. The controller includes a driver circuit, a zero-cross detection circuit, a detecting circuit, and a control circuit, and receive electric power from the capacitor. The driver circuit drives the switching device in accordance with a PWM signal. The control circuit starts generation of a pulse, to be contained in the PWM signal, for turning on the switching device after the zero-cross detection circuit detects zero-cross and also a voltage across the capacitor is threshold or more.

7 Claims, 2 Drawing Sheets

(52) U.S. Cl.
CPC ..... *H05B 33/0818* (2013.01); *H05B 33/0845* (2013.01); *H05B 39/041* (2013.01)

(58) Field of Classification Search
CPC ............ H05B 33/0809; H05B 33/0818; Y02B 20/346; Y02B 20/146; Y02B 20/348
See application file for complete search history.

(56) References Cited

U.S. PATENT DOCUMENTS

| | | | |
|---|---|---|---|
| 9,000,680 B2* | 4/2015 | Melanson | H05B 33/0809 315/291 |
| 9,084,316 B2* | 7/2015 | Melanson | H02M 1/4225 |
| 9,113,516 B2* | 8/2015 | Bordin | H05B 33/0815 |
| 9,215,772 B2* | 12/2015 | Sood | H02M 7/04 |
| 9,307,588 B2* | 4/2016 | Li | H05B 33/0803 |
| 9,320,091 B2* | 4/2016 | Gaknoki | H05B 33/0815 |
| 9,491,845 B2* | 11/2016 | Melanson | H05B 33/0854 |
| 2012/0153930 A1 | 6/2012 | Goto | |
| 2013/0187563 A1 | 7/2013 | Sasai et al. | |
| 2017/0019966 A1* | 1/2017 | Suehiro | H05B 33/0815 |
| 2017/0150568 A1* | 5/2017 | Hayashi | H02M 1/36 |

FOREIGN PATENT DOCUMENTS

| | | |
|---|---|---|
| JP | 2011-050145 A | 3/2011 |
| JP | 2011-050149 A | 3/2011 |
| JP | 2011-087260 A | 4/2011 |
| JP | 2011-238353 A | 11/2011 |
| JP | 2013-004350 A | 1/2013 |
| JP | 2013-149498 A | 8/2013 |
| JP | EP 3128814 A1 * 2/2017 ........... H05B 39/048 |
| JP | EP 3128815 A1 * 2/2017 ........... H05B 39/048 |
| WO | WO 2010/073092 A1 | 7/2010 |

OTHER PUBLICATIONS

Form PCT/ISA/237 for corresponding International Application No. PCT/JP2015/001711 dated Jun. 9, 2015.

* cited by examiner

LIGHT-DIMMING DEVICE

TECHNICAL FIELD

The present invention relates to a light-dimming device configured to dim an illumination load, namely adjust a light output of an illumination load.

BACKGROUND ART

In the configuration of a related light-dimming device it has been known to adjust the light output of an illumination load (for example, see JP 2013-149498 A, hereinafter referred to as "Document 1").

The light-dimming device disclosed in Document 1 includes a pair of terminals, a control circuit, a control power supply for supplying control power to the control circuit, and a light output adjuster for adjusting a light output level of the illumination load.

The control circuit and the control power supply are connected in parallel to each other between the pair of terminals. The pair of terminals allows a series circuit of an AC power supply and the illumination load to be connected between. The illumination load includes a plurality of LED (light emitting diode) elements and a power supply circuit for lighting the LED elements. The power supply circuit includes a smoothing circuit composed of a diode and an electrolytic capacitor.

The control circuit includes a switch for phase control of an AC voltage supplied to the illumination load, a switch driver for driving the switch, and a controller for controlling the switch driver and the control power supply.

The control power supply is connected in parallel to the switch. The control power supply converts the AC voltage of the AC power supply to the control power. The control power supply includes an electrolytic capacitor charged by the control power.

The controller is supplied with the control power from the control power supply through the electrolytic capacitor. The controller includes a microcomputer. The microcomputer performs reverse phase control of interrupting power supply to the illumination load during each half cycle of the AC voltage in accordance with a light output level adjusted with the light output adjuster.

As a related light-dimming device of this sort, a two-wire anti-phase control device has been proposed (for example, see JP 2011-238353 A, hereinafter referred to as "Document 2").

The two-wire anti-phase control device disclosed in Document 2 includes a main current switching circuit, a dimming variable pulse delay circuit, and a DC power generation circuit.

The main current switching circuit includes a main current circuit and two MOSFETs connected in anti-series. The two MOSFETs connected in anti-series are to be connected in parallel to a series circuit of an AC power supply and an illumination load. The dimming variable pulse delay circuit is configured to determine discharge timing of a gate-charge of each of the MOSFETs. The DC power generation circuit is composed of an integration circuit of a resistor and a capacitor. The DC power generation circuit is configured to supply the dimming variable pulse delay circuit with a voltage across the capacitor as DC power.

The microcomputer of the controller in the light-dimming device disclosed in Document 1 performs the reverse phase control for the illumination load. In the light-dimming device, the switch conducts (turns on) from an OFF state when an absolute value of the AC voltage from the AC power supply is a value other than zero, and the electrolytic capacitor of the control power supply is charged by the control power for a certain period of time within time from the OFF state to turn-on of the switch. In the two-wire anti-phase control device disclosed in Document 2, the capacitor of the DC power generation circuit is charged over a period of time until each MOSFET is turned on from an OFF state.

However, in the light-dimming device of Document 1, when the series circuit of the AC power supply and the illumination load is connected between the pair of terminals, the illumination load is provided with the smoothing circuit and therefore the electrolytic capacitor may not be charged well by the control power. It is because there is a possibility that when the switch is in an OFF state, a current would not flow through the illumination load depending on a conduction angle of the switch. This may cause unstable control operation of the controller with respect to the switch driver, thereby making it difficult to maintain a lighting state of the illumination load.

SUMMARY OF INVENTION

An object of the present invention is to provide a light-dimming device capable of maintaining a lighting state of an illumination load more stably.

A light-dimming device according to an aspect of the present invention includes first and second terminals, a switch, an adjuster, a power supply module, and a controller. The first and second terminals allow a series circuit of an AC power supply and an illumination load to be connected between. The switch includes a normally off type switching device connected between the first and second terminals. The adjuster is configured to vary a conduction angle of the switch. The power supply module is connected between the first and second terminals and includes a rectifier circuit, a constant voltage circuit, and a capacitor. The rectifier circuit is configured to convert a voltage between the first and second terminals into a full-wave rectified voltage. The constant voltage circuit is configured to generate a DC voltage from the full-wave rectified voltage by the rectifier circuit. The capacitor is configured to be charged by the constant voltage circuit. The controller is configured to operate with electric power supplied from the capacitor of the power supply module to control the switch. The controller includes a zero-cross detection circuit, a detecting circuit, a control circuit, and a driver circuit. The zero-cross detection circuit is configured to detect zero-cross of the voltage between the first and second terminals with the series circuit connected between the first and second terminals. The detecting circuit is configured to detect a voltage across the capacitor. The control circuit is configured to generate a PWM signal having an on-duty ratio corresponding to the conduction angle acquired from the adjuster. The driver circuit is configured to drive the switching device in accordance with the PWM signal. The controller is configured to control the switch to turn the switching device on and then off within a half cycle of an AC voltage of the AC power supply in accordance with the conduction angle acquired from the adjuster. The control circuit further includes a determination circuit configured to determine whether or not the voltage across the capacitor detected by the detecting circuit is less than threshold. The control circuit is configured to, after the zero-cross detection circuit detects zero-cross of the voltage between the first and second terminals and also the determination circuit determines that the voltage across the capacitor is the threshold or more, start generation of a pulse, to be contained in the PWM signal, for turning on the switching device, and terminate the generation of the pulse when a period of time corresponding to the conduction angle elapses from a start of the generation of the pulse.

DESCRIPTION OF EMBODIMENTS

Figure 1:
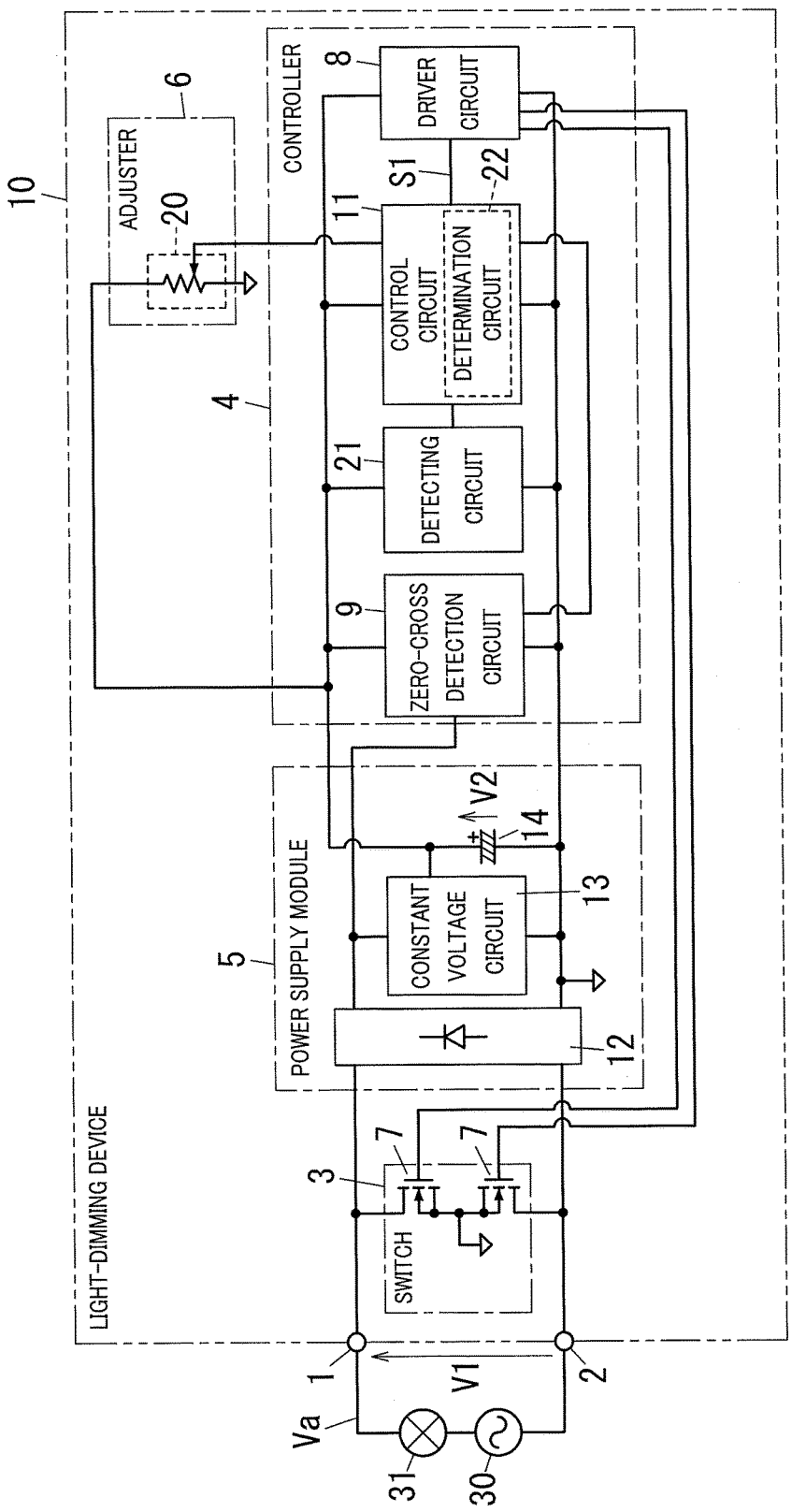
FIG. 1 is a circuit diagram of a light-dimming device of the present embodiment.

Hereinafter, a light-dimming device 10 according to the present embodiment is described in detail with reference to FIG. 1 and FIG. 2.

The light-dimming device 10 is a dimmer, for example. The dimmer is configured to be attached to a mounting frame for wall mounted accessory (wiring device).

The light-dimming device 10 includes first and second terminals 1 and 2, a switch 3 electrically connected between the first and second terminals 1 and 2, a controller 4 configured to control the switch 3, a power supply module 5 configured to supply power to the controller 4, and an adjuster 6 configured to vary a conduction angle (phase angle) of the switch 3. The conduction angle of the switch 3 corresponds to a period of time while the switch 3 is conducting.

The power supply module 5 is electrically connected between the first and second terminals 1 and 2. In an example of FIG. 1, the power supply module 5 is a constant voltage source. The first and second terminals 1 and 2 allow a series circuit of an AC power supply 30 and an illumination load 31 to be electrically connected between. For example, the AC power supply 30 is a commercial power supply, and is used for applying an AC voltage Va to the illumination load 31 through the light-dimming device 10. The illumination load 31 is an LED illumination device, for example. The LED illumination device may be an LED lamp, for example. In the embodiment, the AC power supply 30 and the illumination load 31 are not included in the light-dimming device 10 as components. In the light-dimming device 10, the LED lamp is employed as the LED illumination device, but is not limited to this. The LED illumination device may be a down light, sealing light, or the like, for example.

The switch 3 includes two or more (in the present embodiment, two) normally off type switching devices 7. Each switching device 7 is an n-channel MOSFET (Metal Oxide Semiconductor Field Effect Transistor), for example.

In the light-dimming device 10, the two switching devices 7 and 7 are connected in anti-series with source electrodes thereof connected to each other. In the light-dimming device 10, each switching device 7 is an n-channel MOSFET, but is not limited to this. For example, each switching device 7 may be an IGBT (Insulated Gate Bipolar Transistor).

The controller 4 is configured to control the switch 3 to drive the illumination load 31 in accordance with reverse phase control or modified control of the reverse phase control. The reverse phase control means controlling a current flowing through the illumination load 31 (power supply to the illumination load 31) by switching the switching devices 7 from an OFF state to an ON state when an AC voltage Va of the AC power supply 30 reaches zero, and by switching the switching devices 7 from the ON state to the OFF state when the AC voltage Va of the AC power supply 30 reaches a desired value other than zero. In a specific example of the reverse phase control, the switching devices 7 conduct for a variable period (ON-period) from a start of each half cycle of the AC voltage, wherein the variable period is shorter than each half cycle, and then turn off from an end of the variable period to an end of a corresponding half cycle.

The controller 4 includes a microcomputer with an appropriate program, for example. The program is stored in a memory provided in the microcomputer in advance, for example.

The power supply module 5 includes a rectifier circuit 12, a capacitor 14, and a constant voltage circuit 13. The rectifier circuit 12 is configured to convert a voltage V1 between the first terminal 1 and the second terminal 2 into a full-wave rectified voltage. The constant voltage circuit 13 is configured to generate a DC voltage (hereinafter, referred to as "first DC voltage") from the full-wave rectified voltage by the rectifier circuit 12 and apply the first DC voltage to the capacitor 14. The capacitor 14 is an electrolytic capacitor, for example.

The rectifier circuit 12 is a diode bridge, for example. One of a pair of input ends of the diode bridge is electrically connected to the first terminal (first input terminal) 1, while the other of them is electrically connected to the second terminal (second input terminal) 2. One (in the example FIG. 1, a positive output terminal) of a pair of output ends of the diode bridge is electrically connected to a zero-cross detection circuit 9. The pair of output ends of the diode bridge is electrically connected to an input part of the constant voltage circuit 13.

The constant voltage circuit 13 is a three-terminal regulator, for example. An input terminal and a common terminal (ground terminal) of the three-terminal regulator are electrically connected to the positive output terminal and a negative output terminal of the diode bridge, respectively. A positive electrode and a negative electrode of the capacitor 14 (a positive output terminal and a negative output terminal of the power supply module 5) are electrically connected to an output terminal and the ground terminal of the three-terminal regulator, respectively. In the present embodiment, the ground terminal of the three-terminal regulator is electrically connected to source electrodes of the switching devices 7. In the light-dimming device 10, the three-terminal regulator is employed as the constant voltage circuit 13, but is not limited to this. The constant voltage circuit 13 may be a DC-DC converter, for example.

The positive output terminal of the power supply module 5 (the positive electrode of the capacitor 14) is electrically connected to the controller 4. That is, the controller 4 is configured to be activated by power from the power supply module 5 (the voltage across the capacitor 14). The positive output terminal of the power supply module 5 (the positive electrode of the capacitor 14) is also electrically connected to the adjuster 6.

The controller 4 includes a driver circuit 8, a zero-cross detection circuit 9, a detecting circuit 21, and a control circuit 11. The driver circuit 8 is configured to drive the two switching devices 7 and 7. The zero-cross detection circuit 9 is configured to detect zero-cross of the voltage V1 between the first and second terminals 1 and 2. The detecting circuit 21 is configured to detect the voltage V2 across the capacitor 14. The control circuit 11 is configured to supply a PWM (Pulse Width Modulation) signal S1 to the driver circuit 8.

In short, the driver circuit 8 is configured to turn the switching devices 7 on and off in accordance with the PWM signal S1 from the control circuit 11. Accordingly, the driver circuit 8 is electrically connected to gate electrodes of the switching devices 7. The driver circuit 8 is electrically connected to the positive output terminal of the power supply module 5 (the positive electrode of the capacitor 14). The driver circuit 8 is also electrically connected to source electrodes of the switching devices 7.

The zero-cross detection circuit 9 is electrically connected to the positive output terminal of the power supply module 5 (the positive electrode of the capacitor 14). The zero-cross detection circuit 9 is also electrically connected to the control circuit 11. The zero-cross detection circuit 9 is electrically connected to the source electrodes of the switching devices 7. The zero-cross detection circuit 9 is connected between the pair of output ends of the rectifier circuit 12 (the diode bridge). The zero-cross detection circuit 9 is configured to detect zero-cross of the voltage between the pair of output ends of the rectifier circuit 12, thereby detecting zero-cross of the voltage V1 between the first and second terminals 1 and 2.

The detecting circuit 21 is electrically connected to the positive output terminal of the power supply module 5 (the positive electrode of the capacitor 14). The detecting circuit 21 is electrically connected to the control circuit 11. The detecting circuit 21 is also electrically connected to the source electrodes of the switching devices 7. The detecting circuit 21 is configured to detect the voltage V2 across the capacitor 14.

The control circuit 11 is electrically connected to the positive output terminal of the power supply module 5 (the positive electrode of the capacitor 14) and the adjuster 6. The control circuit 11 is also electrically connected to the driver circuit 8. The control circuit 11 is also electrically connected to the source electrodes of the switching devices 7.

In the light-dimming device 10, the controller 4 includes the microcomputer, but is not limited to such a configuration. For example, the controller 4 may include a control IC (Integrated Circuit). The controller 4 may be composed of discreet parts, for example.

The adjuster 6 includes a variable resistor 20 and an operation part attached to a volume of the variable resistor 20. The variable resistor 20 is configured to vary a resistance value thereof for generating a DC voltage (hereinafter, referred to as "second DC voltage") corresponding to a conduction angle of the switch 3. The variable resistor 20 is a potentiometer with three terminals, for example. The potentiometer functions as a voltage divider. In the potentiometer, two terminals (hereinafter, referred to as a first terminal and a second terminal) are connected to both ends of a resistor device, respectively, and a remaining terminal (hereinafter, referred to as a third terminal) is connected to a sliding contact which is mechanically movable along the resistor device.

The first terminal of the potentiometer is electrically connected to the positive output terminal of the power supply module 5 (the positive electrode of the capacitor 14). The second terminal of the potentiometer is electrically connected to the negative output terminal of the power supply module 5 (the source electrodes of the switching devices 7). The third terminal of the potentiometer is electrically connected to the control circuit 11. In the light-dimming device 10, a value (voltage value) of the second DC voltage is set by the resistance value of the variable resistor 20. That is, in the light-dimming device 10, the size of the conduction angle of the switch 3 is adjusted by the resistance value of the variable resistor 20.

In the light-dimming device 10, the memory stores a data table which includes values of the second DC voltage and on-duty ratios for the PWM signal Si corresponding (e.g., one by one) to the values of the second DC voltage. In the example of FIG. 2, the on-duty ratio is a ratio of a pulse width (ON-period) Ton to a pulse period PC. In the present embodiment, the pulse period PC is a half cycle of the AC voltage of the AC power supply 30. However, as described later, the control circuit 11 starts generation of a pulse, to be contained in the PWM signal S1, for turning on the switching device 7 (for causing the switch 3 to conduct) when or after the voltage V2 across the capacitor 14 reaches threshold or more. Therefore, the start point in time t1, t11 of the ON-period Ton of the PWM signal S1 does not always equal to the start point in time t0, t10 of the half cycle of the AC voltage of the AC power supply 30. A maximum value of the values of the second DC voltage corresponds to a maximum value of the second DC voltage varied with the adjuster 6, and a minimum value of the values of the second DC voltage corresponds to a minimum value of the second DC voltage varied with the adjuster 6. The control circuit 11 is configured to determine an on-duty ratio for the PWM signal S1 corresponding to a value of the second DC voltage by the adjuster 6, based on the data table. The control circuit 11 is also configured to supply the driver circuit 8 with the PWM signal S1 having an on-duty ratio corresponding to the value of the second DC voltage. In short, the control circuit 11 is configured to supply the driver circuit 8 with the PWM signal S1 having an on-duty ratio corresponding to the conduction angle of the switch 3 adjusted with the adjuster 6.

In an alternative example, a data table includes values of the second DC voltage and values of pulse width (ON-period) of the pulse, to be contained in a PWM signal S1, for turning on the switching device 7 corresponding (e.g., one by one) to the values of the second DC voltage. The control circuit 11 is configured to supply the driver circuit 8 with the PWM signal S1 having a pulse period PC corresponding to a period of half cycle of the AC voltage and an ON-period Ton corresponding to the conduction angle of the switch 3 adjusted with the adjuster 6.

In the light-dimming device 10, the resistance value of the variable resistor 20 varies according to the operation of the operation part. In other words, the size of the conduction angle of the switch 3 in the light-dimming device 10 varies according to the operation of the operation part.

In the light-dimming device 10, a rotary potentiometer is employed as the variable resistor 20, but is not limited to this. The variable resistor 20 may be a linear potentiometer, for example.

The control circuit 11 includes a determination circuit 22 configured to determine whether or not the voltage V2 across the capacitor 14 detected by the detecting circuit 21 is less than predetermined threshold. The determination circuit 22 is a comparator, for example. The threshold is stored in the aforementioned memory, for example. That is, the determination circuit 22 (continuously) compares the voltage V2 across the capacitor 14 with the threshold.

The control circuit 11 is configured to, after the zero-cross detection circuit 9 detects zero-cross of the voltage V1 between the first and second terminals 1 and 2 and also the determination circuit 22 determines that the voltage V2 across the capacitor 14 is the threshold or more, start generation of a pulse, to be contained in the PWM signal S1, for turning on the switching device 7. For example, once the determination circuit 22 has determined that the voltage V2 across the capacitor 14 is less than the threshold, the control circuit 11 starts generation of a pulse, to be contained in the PWM signal S1, for turning on the switching device 7 (for causing the switch 3 to conduct) after the zero-cross detection circuit 9 detects the zero-cross of the voltage V1 between the first and second terminals 1 and 2 and also the voltage V2 across the capacitor 14 is the threshold or more. The control circuit 11 is configured to terminate the generation of the pulse when a period of time (ON-period Ton) corresponding to the conduction angle acquired from the adjuster 6 elapses from a start of the generation of the pulse.

Figure 2:
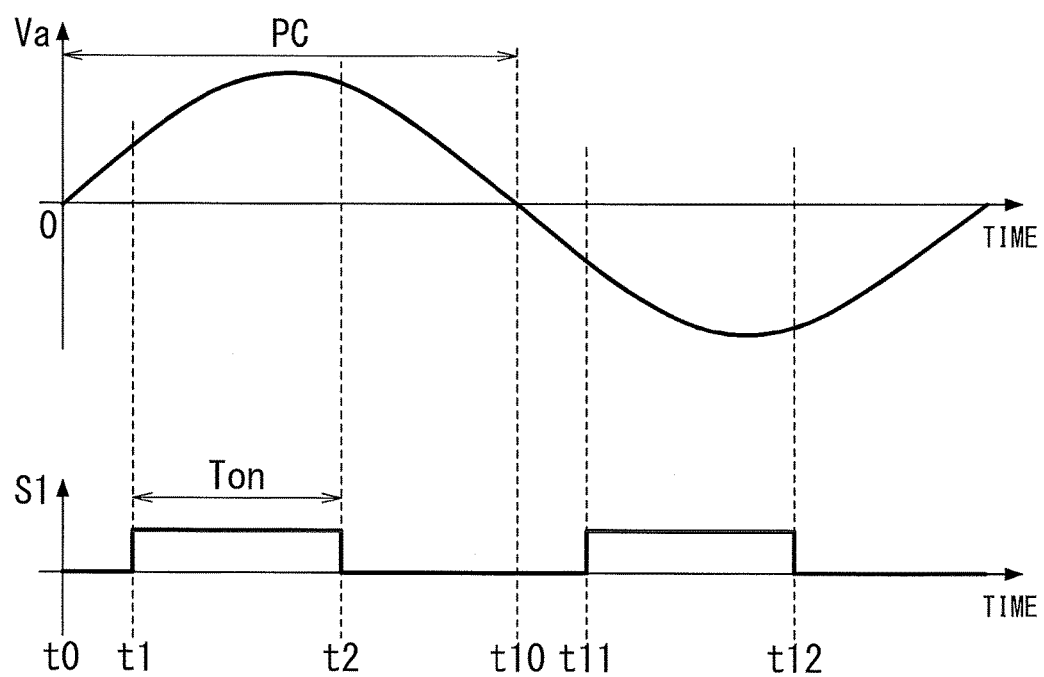
FIG. 2 is a graph illustrating a waveform of an AC voltage of an AC power supply applied to the light-dimming device of the present embodiment and a waveform of a PWM signal from a control circuit of the light-dimming device.

FIG. 2 shows an example of a waveform of the AC voltage Va of the AC power supply 30 and a waveform of the PWM signal S1 from the control circuit 11. In the example of FIG. 2, the control circuit 11 is configured to start generation of a pulse, to be contained in the PWM signal S1, for turning on the switching device 7 (for causing the switch 3 to conduct) when the voltage V2 across the capacitor 14 reaches the threshold or more after the zero-cross detection circuit 9 detects zero-cross of the voltage V1 between the first and second terminals 1 and 2. In other words, the control circuit 11 is configured to, after a pulse, to be contained in the PWM signal S1, for turning on the switching device 7 is terminated, start generation of a next pulse when both of first and second conditions are satisfied. The first condition is that zero-cross of the voltage V1 between the first and second terminals 1 and 2 has been detected through the zero-cross detection circuit 9. The second condition is that the voltage V2 across the capacitor 14 has been determined to be the threshold or more through the determination circuit 22.

In FIG. 2A, Va of a vertical axis represents the AC voltage of the AC power supply 30. In FIG. 2, S1 of a vertical axis represents the PWM signal from the control circuit 11. In FIG. 2, each horizontal axis represents time. In FIG. 2, t0, t10 indicate points in time when the zero-cross detection circuit 9 detects zero-cross of the voltage V1 between the first and second terminals 1 and 2. In FIG. 2, t1, t11 indicate points in time when the voltage V2 across the capacitor 14 reaches the threshold or more. In the example of FIG. 2, the control circuit 11 is configured to start generation of a pulse for turning on the switching device 7 (for causing the switch 3 to conduct) when the voltage V2 across the capacitor 14 reaches the threshold or more. Therefore, t1, t11 also indicate points in time when the switch 3 conducts from an OFF state. Also, t2, t12 indicate points in time when the switch 3 turns off from a conduction state.

In the light-dimming device 10, once the determination circuit 22 determines that the voltage V2 across the capacitor 14 is less than the threshold, the switch 3 conducts from OFF state when the voltage V2 across the capacitor 14 reaches the threshold or more after the voltage V1 between the first and second terminals 1 and 2 crosses the zero voltage. That is, in the light-emitting device 10, even if the voltage V1 between the first and second terminals 1 and 2 crosses the zero voltage while the voltage V2 across the capacitor 14 is less than the threshold, the switch 3 does not conduct from the OFF state until the voltage V2 across the capacitor 14 reaches the threshold or more. In other words, in the light-dimming device 10, if the voltage V1 between the first and second terminals 1 and 2 crosses the zero voltage while the voltage V2 across the capacitor 14 is less than the threshold, the switch 3 is kept at the OFF state so that the capacitor 14 is charged by the constant voltage circuit 13, until the voltage V2 across the capacitor 14 reaches the threshold or more. The light-dimming device 10 can therefore stabilize the operation of the controller 4 when the switch 3 conducts from the OFF state, as compared with the light-dimming device disclosed in Document 1. Accordingly, the light-dimming device 10 can maintain the lighting state of the illumination load 31 more stably in comparison with the light-dimming device of Document 1. Since the light-dimming device 10 can maintain the lighting state of the illumination load 31 more stably in comparison with the light-dimming device of Document 1, it is possible to increase the number of types of the illumination load 31, capable of maintaining respective lighting states.

Preferably, the determination circuit 22 is configured to determine whether or not the voltage V2 across the capacitor 14 is less than the threshold in a period after the zero-cross detection circuit 9 detects zero-cross of the voltage V1 between the first and second terminals 1 and 2 within a half cycle of the AC voltage of the AC power supply 30. Preferably, the control circuit 11 is configured to, in a case of the determination circuit 22 determining that the voltage V2 across the capacitor 14 is the threshold or more in the half cycle of the AC voltage, start generation of a pulse to be contained in the PWM signal S1 when the zero-cross detection circuit 9 detects a next zero-cross, which corresponds to a start of a next half cycle of the AC voltage, of the voltage V1 between the first and second terminals 1 and 2.

Specifically, the control circuit 11 is configured to, in a case of the determination circuit 22 determining that the voltage across the capacitor 14 is the threshold or more immediately before the zero-cross detection circuit 9 detects zero-cross of the voltage V1 between the first and second terminals 1 and 2, start generation of a pulse to be contained in the PWM signal S1 when zero-cross of the voltage V1 between the first and second terminals 1 and 2 is detected.

With the light-dimming device 10 of this configuration, in a case the voltage V1 between the first and second terminals 1 and 2 crosses the zero voltage while the voltage V2 across the capacitor 14 is the threshold or more, it is possible to start generation of a pulse for turning on the switching device 7 right after (when) zero-cross of the voltage V1 between the first and second terminals 1 and 2 is detected, for example. With the light-dimming device 10, it is possible to reduce a time from detection of the zero-cross of the voltage V1 to an output of a pulse from the control circuit 11, in comparison with a configuration in which the generation of a pulse is started after the zero-cross of the voltage V1 between the first and second terminals 1 and 2 is detected and then the voltage V2 across the capacitor 14 reaching the threshold or more is detected. Accordingly, in the light-dimming device 10, it is possible to switch the switch 3 near the zero voltage when small current flows through the illumination load 31, in comparison with a configuration in which the generation of a pulse is started after the zero-cross of the voltage V1 between the first and second terminals 1 and 2 is detected and then the voltage V2 across the capacitor 14 reaching the threshold or more is detected. Consequently, it is possible to reduce noise. The meaning of "the determination circuit 22 determines that the voltage V2 across the capacitor 14 is the threshold or more" indicates a point in time at which the determination circuit 22 determines that the voltage V2 across the capacitor 14 is the threshold or more, but is not limited to this. For example, the meaning of "the determination circuit 22 determines that the voltage V2 across the capacitor 14 is the threshold or more" may indicate a certain point in time contained in a predetermined period of time from the time at which the determination circuit 22 determines that the voltage V2 across the capacitor 14 is the threshold or more. Similarly, the meaning of "the time at which zero-cross of the voltage V1 between the first and second terminals is detected" indicates a point in time at which the voltage V1 between the first and second terminals crosses the zero voltage, but is not limited to this. For example, the meaning of "the time at which zero-cross of the voltage V1 between the first and second terminals is detected" may indicate a certain point in time contained in a predetermined period of time from the time at which the voltage V1 between the first and second terminals crosses the zero voltage.

Preferably, the determination circuit 22 is configured to, after the zero-cross detection circuit 9 detects zero-cross of the voltage V1 between the first and second terminals 1 and 2, (continuously) determine whether or not the voltage V2 across the capacitor 14 is less than the threshold. Preferably, the control circuit 11 is configured to start generation of the pulse to be contained in the PWM signal S1 when the determination circuit 22 determines that the voltage V2 across the capacitor 14 is the threshold or more.

Preferably, the determination circuit 22 is configured to, before the zero-cross detection circuit 9 detects zero-cross of the voltage V1 between the first and second terminals 1 and 2, determine whether or not the voltage V2 across the capacitor 14 is less than the threshold. Preferably, the determination circuit 22 is configured to, in a case of determining that the voltage V2 across the capacitor 14 is the threshold or more before the zero-cross of the voltage V1 between the first and second terminals 1 and 2 is detected, stop determining whether or not the voltage V2 across the capacitor 14 is less than the threshold after the zero-cross detection circuit 9 detects the zero-cross of the voltage between the first and second terminals 1 and 2. Preferably, the control circuit 11 is configured to start generation of a pulse to be contained in the PWM signal S1 when the zero-cross detection circuit 9 detects the zero-cross of the voltage V1 between the first and second terminals 1 and 2.

In the light-dimming device 10, in a case the illumination load 31 is set to have a low light output level (the illumination load 31 is set to be comparatively dark), a period of time from the switch 3 conducting from the OFF state to zero-cross of the voltage V1 between the first and second terminals 1 and 2 is long. Since the capacitor 14 is charged for this period, the voltage V2 across the capacitor 14 would reach a value larger than the threshold before the zero-cross of the voltage V1 between the first and second terminals 1 and 2 is detected. Accordingly, in the light-dimming device 10, in a case the light output level of the illumination load 31 is low, it is possible to start generation of a pulse for turning on the switching device 7 when zero-cross of the voltage V1 between the first and second terminals 1 and 2 is detected. Hence, in the light-dimming device 10, the switch 3 can conduct from the OFF state when a small current flows through the illumination load 31. Consequently, it is possible to reduce the noise, in comparison with a configuration in which the generation of a pulse is started after the zero-cross of the voltage V1 between the first and second terminals 1 and 2 is detected and then the voltage V2 across the capacitor 14 reaching the threshold or more is detected.

In the light-dimming device 10, the LED illumination device is employed as the illumination load 31, but is not limited to this. The illumination load 31 may be an incandescent lamp, for example. Examples of the incandescent lamp include a tungsten halogen lamp, a krypton lamp, and the like.

As described above, the light-dimming device 10 according to the present embodiment includes the first and second terminals 1 and 2, the switch 3, the adjuster 6, the power supply module 5, and the controller 4. The first and second terminals 1 and 2 allow the series circuit of the AC power supply 30 and the illumination load 31 to be connected between. The switch 3 includes a (at least one) normally off type switching device 7 connected between the first and second terminals 1 and 2. The adjuster 6 is configured to vary a conduction angle of the switch 3. The power supply module 5 is connected between the first and second terminals 1 and 2, and includes the rectifier circuit 12, the constant voltage circuit 13, and the capacitor 14. The rectifier circuit 12 is configured to convert a voltage V1 between the first and second terminals 1 and 2 into a full-wave rectified voltage. The constant voltage circuit 13 is configured to generate a DC voltage (first DC voltage) from the full-wave rectified voltage by the rectifier circuit 12. The capacitor 14 is configured to be charged by the constant voltage circuit 13. The controller 4 is configured to operate with electric power supplied from the capacitor 14 of the power supply module 5 to control the switch 3. The controller 4 includes the zero-cross detection circuit 9, the detecting circuit 21, the control circuit 11, and the driver circuit 8. The zero-cross detection circuit 9 is configured to detect zero-cross of the voltage V1 between the first and second terminals 1 and 2 with the series circuit connected between the first and second terminals 1 and 2. The detecting circuit 21 is configured to detect a voltage across the capacitor 14. The control circuit 11 is configured to generate a PWM signal S1 having an on-duty ratio (Ton/PC) corresponding to the conduction angle acquired from the adjuster 6. The driver circuit 8 is configured to drive the switching device 7 in accordance with the PWM signal S1. The controller 4 is configured to control the switch 3 to turn the switching device 7 on and then off within a half cycle (see "PC" in FIG. 2) of an AC voltage of the AC power supply 30 in accordance with the conduction angle acquired from the adjuster 6. The control circuit 11 further includes the determination circuit 22 configured to determine whether or not the voltage V2 across the capacitor 14 detected by the detecting circuit 21 is less than threshold. The control circuit 11 is configured to, after the zero-cross detection circuit 9 detects zero-cross of the voltage V1 between the first and second terminals 1 and 2 and also the determination circuit 22 determines that the voltage V2 across the capacitor 14 is the threshold or more, start generation of a pulse, to be contained in the PWM signal S1, for turning on the switching device 7 (for causing the switch 3 to conduct). The control circuit 11 is configured to terminate the generation of the pulse when a period of time (ON-period Ton) corresponding to the conduction angle elapses from a start of the generation of the pulse.

In the light-dimming device 10 of the present embodiment, the control circuit 11 is configured to, after the zero-cross detection circuit 9 detects zero-cross of the voltage V1 between the first and second terminals 1 and 2 and also the determination circuit 22 determines that the voltage V2 across the capacitor 14 is the threshold or more, start generation of a pulse, to be contained in the PWM signal S1, for turning on the switching device 7. That is, in the light-dimming device 10, the control circuit 11 is configured to, once the determination circuit 22 determines that the voltage V2 across the capacitor 14 is less than the threshold, start generation of a pulse, to be contained in the PWM signal S1, for turning on the switching device 7 after the zero-cross detection circuit 9 detects zero-cross of the voltage V1 between the first and second terminals 1 and 2 and then the voltage V2 reaches the threshold or more. With the light-dimming device 10 of the present embodiment, when a series circuit of the AC power supply 30 and the illumination load 31 is connected between the first and second terminals 1 and 2, a current flows through the illumination load 31 and is supplied to the power supply module 5 until the voltage V2 across the capacitor 14 reaches the threshold and the current. Accordingly, in the light-dimming device 10, it is possible to stabilize the operation of the controller 4 in comparison with the light-dimming device of Document 1. As a result, it is possible to maintain the lighting state of the illumination load 31 more stably.

In one embodiment, the determination circuit 22 is configured to determine whether or not the voltage V2 across the capacitor 14 is less than the threshold in a period after the zero-cross detection circuit 9 detects zero-cross of the voltage V1 between the first and second terminals 1 and 2 within a half cycle of the AC voltage of the AC power supply 30. The control circuit 11 is configured to, in a case of the determination circuit 22 determining that the voltage V2 across the capacitor 14 is the threshold or more in the half cycle of the AC voltage, start the generation of the pulse to be contained in the PWM signal S1 when the zero-cross detection circuit 9 detects a next zero-cross, which corresponds to a start of a next half cycle of the AC voltage, of the voltage V1 between the first and second terminals 1 and 2.

With this configuration, in the light-dimming device 10, it is possible to start generation of a pulse for turning on the switching device 7 right after (when) zero-cross of the voltage V1 between the first and second terminals 1 and 2 is detected, for example. With the light-dimming device 10, it is possible to reduce a time from detection of the zero-cross of the voltage V1 to an output of a pulse from the control circuit 11, in comparison with a configuration in which the generation of a pulse is started after the zero-cross of the voltage V1 between the first and second terminals 1 and 2 is detected and then the voltage V2 across the capacitor 14 reaching the threshold or more is detected. Accordingly, in the light-dimming device 10, it is possible to switch the switch 3 near the zero voltage when small current flows through the illumination load 31, in comparison with a configuration in which the generation of a pulse is started after the zero-cross of the voltage V1 between the first and second terminals 1 and 2 is detected and then the voltage V2 across the capacitor 14 reaching the threshold or more is detected. Consequently, it is possible to reduce noise. The meaning of "the determination circuit 22 determines that the voltage V2 across the capacitor 14 is the threshold or more" indicates a point in time at which the determination circuit 22 determines that the voltage V2 across the capacitor 14 is the threshold or more, but is not limited to this.

In one embodiment, the determination circuit 22 is configured to, after the zero-cross detection circuit 9 detects zero-cross of the voltage V1 between the first and second terminals 1 and 2, determine whether or not the voltage V1 across the capacitor 14 is less than the threshold. The control circuit 11 is configured to start the generation of the pulse to be contained in the PWM signal Si when the determination circuit 22 determines that the voltage across the capacitor 14 is the threshold or more.

In one embodiment, the determination circuit 22 is configured to, before the zero-cross detection circuit 9 detects zero-cross of the voltage V1 between the first and second terminals 1 and 2, determine whether or not the voltage V2 across the capacitor 14 is less than the threshold. The determination circuit 22 is configured to, in a case of determining that the voltage V2 across the capacitor 14 is the threshold or more, stop determining whether or not the voltage V2 across the capacitor 14 is less than the threshold after the zero-cross detection circuit 9 detects the zero-cross of the voltage V1 between the first and second terminals 1 and 2. The control circuit 11 is configured to, in a case of the determination circuit 22 determining that the voltage V2 across the capacitor 14 is the threshold or more, start the generation of the pulse to be contained in the PWM signal S1 when the zero-cross detection circuit 9 detects the zero-cross of the voltage V1 between the first and second terminals 1 and 2.

In the light-dimming device 10, in a case the illumination load 31 is set to have a low light output level, a period of time from the switch 3 conducting from the OFF state to zero-cross of the voltage V1 between the first and second terminals 1 and 2 is long. Since the capacitor 14 is charged for this period, the voltage V2 across the capacitor 14 would reach a value larger than the threshold before the zero-cross of the voltage V1 between the first and second terminals 1 and 2 is detected. Accordingly, in the light-dimming device 10, in a case the light output level of the illumination load 31 is low, it is possible to start generation of a pulse for turning on the switching device 7 when zero-cross of the voltage V1 between the first and second terminals 1 and 2 is detected. Hence, in the light-dimming device 10, the switch 3 can conduct from the OFF state when a small current flows through the illumination load 31. Consequently, it is possible to reduce the noise, in comparison with a configuration in which the generation of a pulse is started after the zero-cross of the voltage V1 between the first and second terminals 1 and 2 is detected and then the voltage V2 across the capacitor 14 reaching the threshold or more is detected.

The invention claimed is:

1. A light-dimming device, comprising:
   first and second terminals that allow a series circuit of an AC power supply and an illumination load to be connected between;
   a switch including a normally off type switching device connected between the first and second terminals;
   an adjuster configured to vary a conduction angle of the switch;
   a power supply module connected between the first and second terminals and including
      a rectifier circuit configured to convert a voltage between the first and second terminals into a full-wave rectified voltage,
      a constant voltage circuit configured to generate a DC voltage from the full-wave rectified voltage by the rectifier circuit, and
      a capacitor configured to be charged by the constant voltage circuit; and
   a controller configured to operate with electric power supplied from the capacitor of the power supply module to control the switch, the controller including
      a zero-cross detection circuit configured to detect zero-cross of the voltage between the first and second terminals with the series circuit connected between the first and second terminals,
      a detecting circuit configured to detect a voltage across the capacitor,
      a control circuit configured to generate a PWM signal having an on-duty ratio corresponding to the conduction angle acquired from the adjuster, and
      a driver circuit configured to drive the switching device in accordance with the PWM signal, wherein the controller is configured to control the switch to turn the switching device on and then off within a half cycle of an AC voltage of the AC power supply in accordance with the conduction angle acquired from the adjuster, the control circuit further includes a determination circuit configured to determine whether or not the voltage across the capacitor detected by the detecting circuit is less than threshold, and the control circuit is configured to
- after the zero-cross detection circuit detects zero-cross of the voltage between the first and second terminals and also the determination circuit determines that the voltage across the capacitor is the threshold or more, start generation of a pulse, to be contained in the PWM signal, for turning on the switching device, and
- terminate the generation of the pulse when a period of time corresponding to the conduction angle elapses from a start of the generation of the pulse.

2. The light-dimming device of claim 1, wherein:

the determination circuit is configured to, after the zero-cross detection circuit detects zero-cross of the voltage between the first and second terminals, determine whether or not the voltage across the capacitor is less than the threshold; and the control circuit is configured to start the generation of the pulse to be contained in the PWM signal when the determination circuit determines that the voltage across the capacitor is the threshold or more.

3. The light-dimming device of claim 2, wherein the determination circuit is configured to
- before the zero-cross detection circuit detects zero-cross of the voltage between the first and second terminals, determine whether or not the voltage across the capacitor is less than the threshold, and
- in a case of determining that the voltage across the capacitor is the threshold or more, stop determining whether or not the voltage across the capacitor is less than the threshold after the zero-cross detection circuit detects the zero-cross of the voltage between the first and second terminals, and the control circuit is configured to, in a case of the determination circuit determining that the voltage across the capacitor is the threshold or more, start the generation of the pulse to be contained in the PWM signal when the zero-cross detection circuit detects the zero-cross of the voltage between the first and second terminals.

4. The light-dimming device of claim 1, wherein the determination circuit is configured to determine whether or not the voltage across the capacitor is less than the threshold in a period after the zero-cross detection circuit detects zero-cross of the voltage between the first and second terminals within a half cycle of the AC voltage of the AC power supply, and the control circuit is configured to, in a case of the determination circuit determining that the voltage across the capacitor is the threshold or more in the half cycle of the AC voltage, start the generation of the pulse to be contained in the PWM signal when the zero-cross detection circuit detects a next zero-cross, which corresponds to a start of a next half cycle of the AC voltage, of the voltage between the first and second terminals.

5. A light-dimming device, comprising:

first and second terminals;

a switch connected between the first and second terminals;

an adjuster configured to adjust a conduction angle of the switch;

a controller configured to control the switch; and a power supply module connected between the first and second terminals and configured to supply power to the controller, wherein the controller is configured to, within a half cycle of an AC voltage:
- keep the switch off until a first period of time elapses from a point in time of zero-cross of the AC voltage,
- turn on the switch when the first period of time elapses and keep the switch on until a second period of time having a length corresponding to the conduction angle adjusted by the adjuster elapses from turning on the switch, and
- turn off the switch when the second period of time elapses from turning on the switch and keep the switch off until an end of the half cycle, and the first period of time has a length equal to or more than zero, and is, set to a period of time from the point in time of the zero-cross to a point in time when a voltage value of the power supplied from the power supply module to the controller is equal to threshold or more in case the voltage value of the power at the point in time of the zero-cross is less than the threshold.

6. The light dimming device of claim 5, wherein in case the voltage value of the power supplied from the power supply module to the controller at the point in time of the zero-cross is the threshold or more, the length of the first period of time is set to zero.

7. A light-dimming device, comprising:

a switching device connected to an AC power supply in series to a load and configured to phase-control an AC voltage supplied to the load;

a zero-cross detection circuit configured to detect a phase of the AC voltage of the AC power supply;

a power supply module connected to the switching device in parallel and configured to perform a converting action of converting the AC power supply into predetermined control power and include a capacitive element that accumulates the control power;

a detecting circuit configured to detect a voltage across the capacitive element;

a determination circuit configured to determine whether or not the voltage across the capacitive element detected by the detecting circuit is less than threshold; and a controller configured to
- divide, on a basis of the phase detected by the zero-cross detection circuit, a period of a half cycle of the AC voltage into a first section, a second section, and a third section,
- in the first section, in case the determination circuit determines that the voltage across the capacitive element is less than the threshold at a time of a zero-cross of the AC voltage, subject the switching device to non-conduction control to interrupt power supply to the load and subject the power supply module to perform the converting action until the voltage across the capacitive element reaches the threshold or more,
- in the second section, subject the switching device to conduction control to supply electric power to the load, and in the third section, subject the switching device to the non-conduction control to interrupt the power supply to the load.

* * * * *